United States Patent [19]

Thompson

[11] 4,308,564

[45] Dec. 29, 1981

[54] HEAD LOAD/UNLOAD MECHANISM FOR ROTATING MAGNETIC MEMORIES

[75] Inventor: Herbert E. Thompson, Los Gatos, Calif.

[73] Assignee: Xerox Corporation, Stamford, Conn.

[21] Appl. No.: 97,119

[22] Filed: Nov. 26, 1979

[51] Int. Cl.³ .................. G11B 5/06; G11B 21/12
[52] U.S. Cl. .............................. 360/99; 360/130.34
[58] Field of Search ........................ 360/105–107, 360/97–99, 130.34, 109, 133, 135, 86

[56] References Cited

U.S. PATENT DOCUMENTS

| | | | |
|---|---|---|---|
| 3,810,243 | 5/1974 | McGinnis et al. | 360/98 |
| 3,879,757 | 4/1975 | Elliot et al. | 360/99 |
| 3,975,774 | 8/1976 | Helbers | 360/105 X |
| 4,218,714 | 8/1980 | Isozaki et al. | 360/130.34 X |

*Primary Examiner*—John H. Wolff

[57] ABSTRACT

A head load/unload mechanism for a rotating magnetic memory, such as a single or double sided floppy disk drive, comprises a lifter arm which is mounted for viscously damped rotation on a control arm for selectively loading and unloading the read-write head or heads of the drive under the control of a snap action solenoid. A pressure pad may be mounted on the control arm for movement into and out of pressure transmitting relationship with a recording medium supporting platen under the control of the solenoid whereby the recording medium is flattened between the pressure and the platen when the head or heads are loaded to transfer data to or from the recording medium.

11 Claims, 9 Drawing Figures

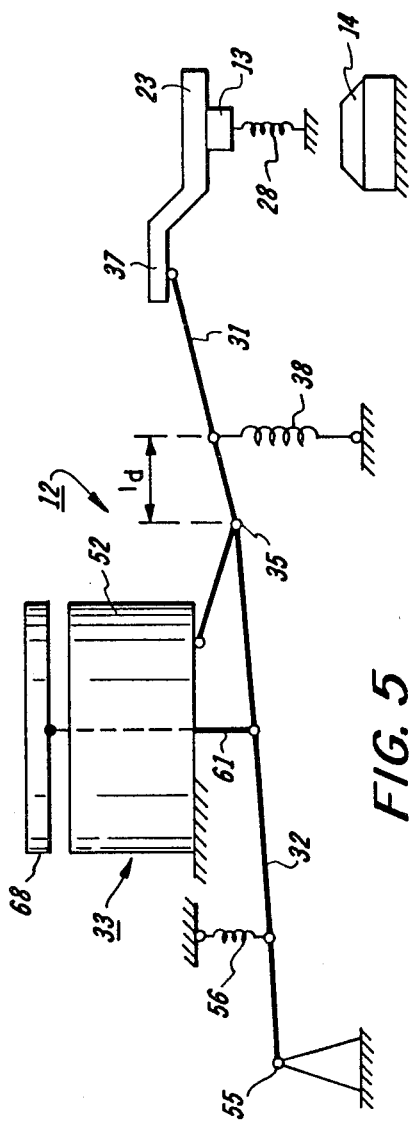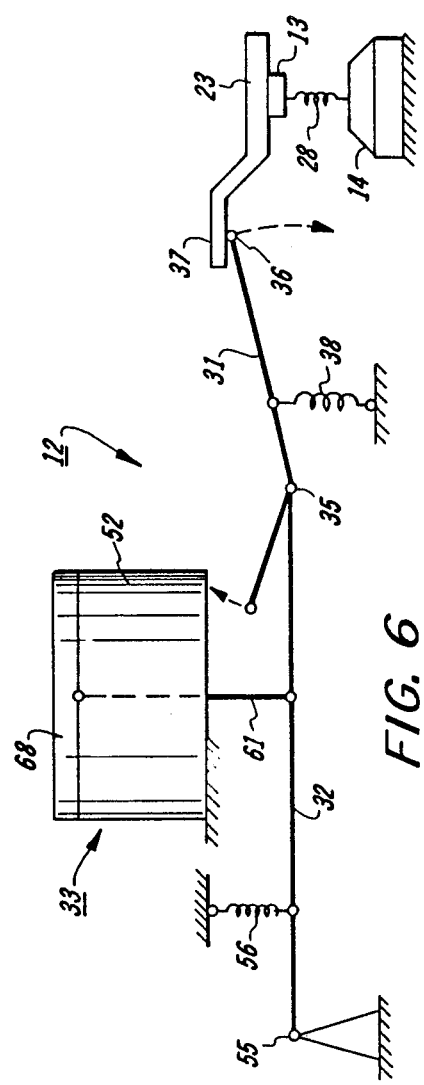

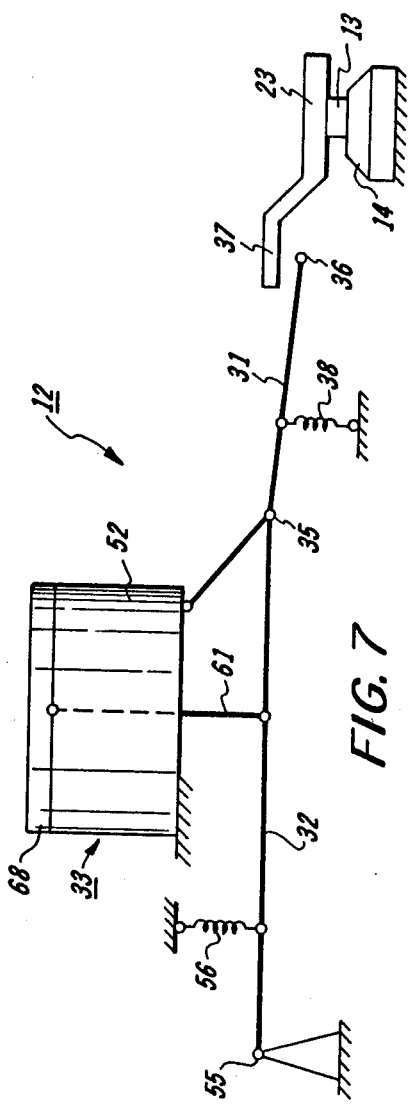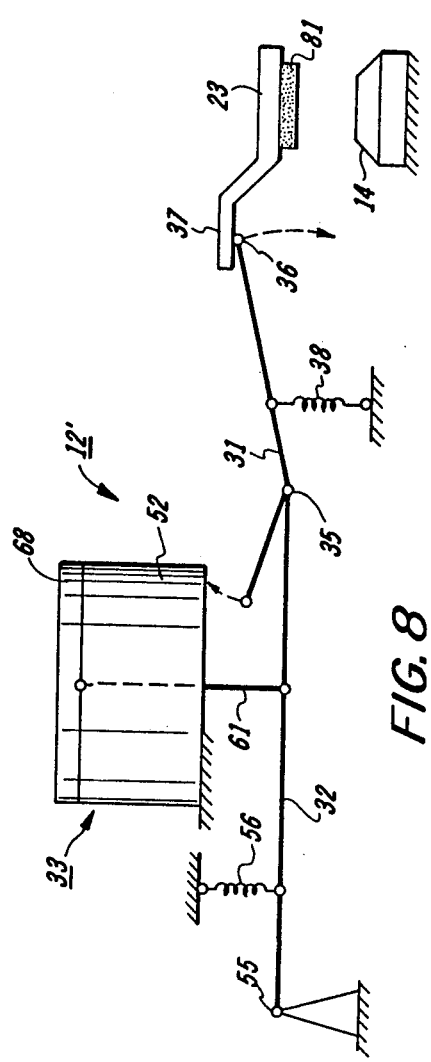

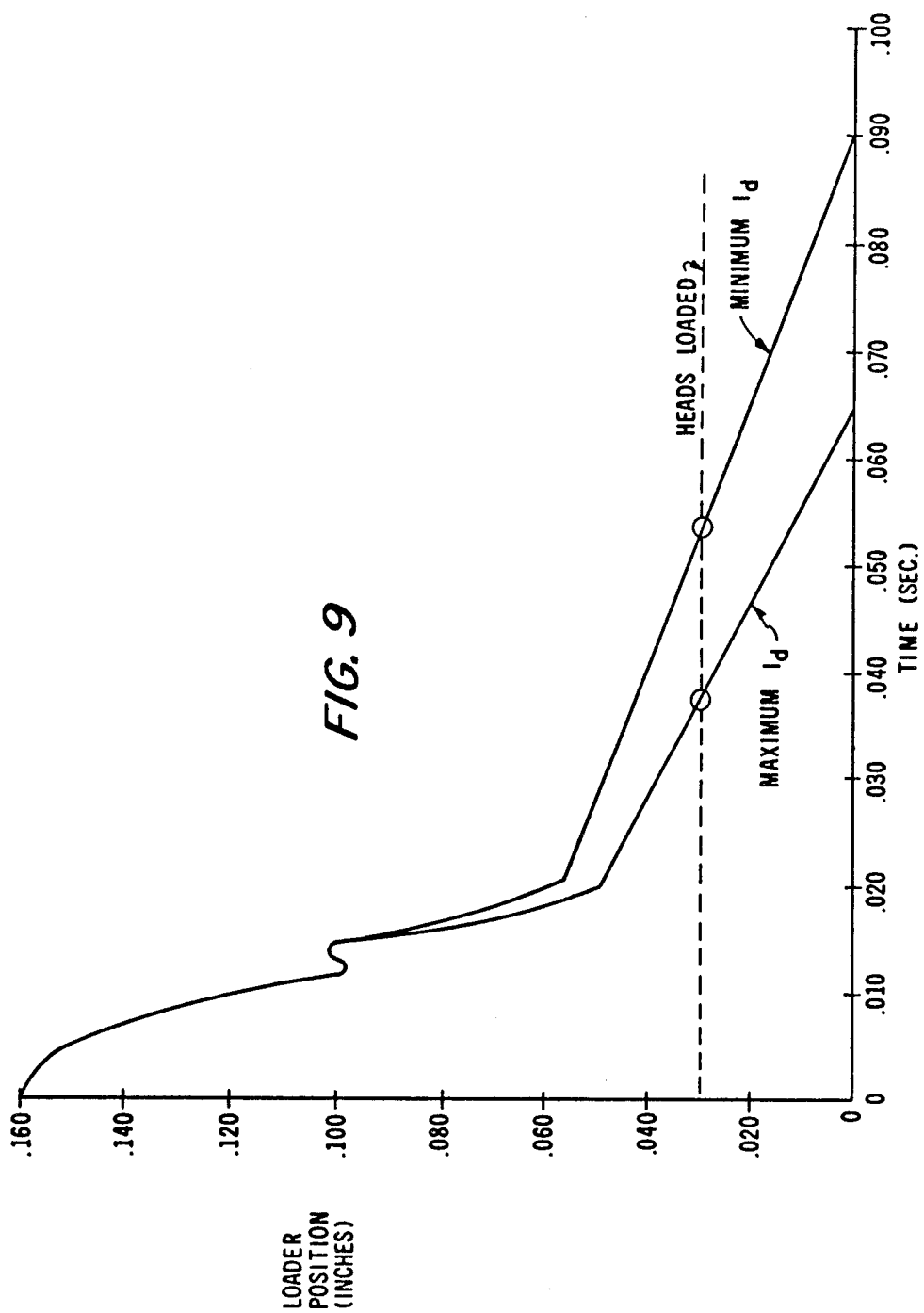

HEAD LOAD/UNLOAD MECHANISM FOR ROTATING MAGNETIC MEMORIES

I. BACKGROUND OF THE INVENTION

This invention relates to head load/unload mechanisms for rotating magnetic memories and, more particularly, to solenoid controlled head load/unload mechanisms for loading and unloading the read/write head or heads of single or double sided floppy disk drives into and out of data transfering relationship with a magnetic recording medium.

Floppy disk drives customarily employ a recording medium comprising a thin, pliant, disk-shaped substrate which has a magnetic oxide surface coating. Such a recording medium is conventionally encased within a protective outer jacket, but there normally are radially extending access slots which pass through the opposing faces of the jacket so that the read/write head or heads of a drive can be compliantly loaded directly against the recording medium to transfer data thereto or therefrom. In operation, the recording medium is inserted into a drive where it is clamped on a spindle for rotation at a substantially constant rate within its protective jacket. The head or heads of the drive are aligned with the access slots in the jacket and are mounted for movement radially of the recording medium so that any selected one of a plurality of concentric data tracks may be accessed. As will be appreciated, a double sided drive provides access to the data tracks on either side of the recording medium, while a single sided drive only has access to the data tracks on one side of the recording medium.

To avoid excessive head/media wear, most single and double sided floppy disk drives have a solenoid controlled head load/unload mechanism for selectively "loading" and "unloading" the read/write head or heads depending on whether the drive is operating in an active data transferring mode or not. When the drive is selected for a data transfer with, say, a host computer, the heads are "loaded" against the recording medium. Otherwise, however, the head or heads are displaced or "unloaded" from the recording medium to prevent any significant head/media wear from occurring, even if the drive is operated for extended periods of time in a standby mode.

Prior solenoid controlled head load/unload mechanisms have generally included means for damping the unloading motion of the head or heads to prevent them from bouncing back into contact with the recording medium. Moreover, it has been suggested that the head/media wear can be further reduced if the loading motion of the head or heads is also damped, but the mechanisms which have been proposed for accomplishing that are not completely satisfactory. For example, one proposal has involved the use of an internally damped solenoid, but cost effective snap action solenoids do not readily lend themselves to internal damping because they generate substantial forces. Another proposal has been based on the use of a dash pot to reduce the velocity of the head or heads as they impact against the recording medium, but that adds an additional component which must be individually aligned with the head/carriage assembly of the drive.

II. SUMMARY OF THE INVENTION

This invention provides a relatively economical and reliable, bidirectionally damped, solenoid controlled head load/unload mechanism for rotating magnetic memories, such as single and double sided floppy disk drives. A cost effective snap action solenoid may be used because the bidirectionally damped member of the head load/unload mechanism is decoupled from the solenoid. Floppy disk drives equipped with such a head load/unload mechanism can achieve head load times as low as 50 milliseconds or so, without requiring head/media impact velocities in excess of about 2 inches/second, even if the stroke of the head load/unload mechanism is selected to provide ample clearance for insertion or removal of a standard diskette (i.e., the conventional jacket protected recording medium) when the head or heads are unloaded. In view of the low head/media impact velocities which can be obtained, no significant head/media damage is likely to occur, even if the head or heads of a floppy disk drive are repeatedly loaded, say 50,000 times, against the same point or points on the recording medium.

Briefly, to carry out the present invention, a head load/unload mechanism for a rotating magnetic memory, such as a single or double sided floppy disk drive, suitably comprises a control arm which is secured to the push rod of a snap action solenoid and a lifter arm which is pivotally mounted for damped rotation on the control arm. The control arm is pivotally supported on the baseframe of the drive and is biased so that one end of the lifter arm is urged toward a reference surface, such as the solenoid coil housing. The other or opposite end of the lifter arm underlies a tab projecting from the support arm for the movable read/write head or load pad (i.e., the movable reaction element) of the drive.

In keeping with accepted practices, the support arm is biased to urge the movable head or load pad toward its loaded position. Under quiescent conditions, however, the reaction of the lifter arm against the solenoid housing causes the lifter arm to maintain the movable head or load pad in its unloaded position. But, when the solenoid is energized, the control arm swings the lifter arm away from the solenoid housing, thereby allowing the lifter arm to rotate, under the influence of a bias applied thereto, through a sufficient angle to permit the movable head or load pad to move from its unloaded position to its loaded position. Conversely, when the solenoid is de-energized, the bias applied to the control arm causes the lifter arm to react against the solenoid housing such that the lifter arm counter-rotates through the aforementioned angle to restore the movable head or load pad to the unloaded position. As will be appreciated, the movement of the movable head or load pad is bidirectionally damped on account of the damped rotation of the control arm.

When such a head load/unload mechanism is applied to a floppy disk drive, the head/media displacement when the head or heads are unloaded is advantageously selected to provide ample clearance to accommodate the insertion and removal of a jacket protected recording medium. Moreover, a pressure pad can be mounted on the control arm to press the recording medium and its protective jacket against a platen when the head or heads are loaded, so as to counteract recording medium defects, such as bowing, which might otherwise degrade the designed head/media compliance.

III. BRIEF DESCRIPTION OF THE DRAWINGS

Still further objects and advantages of this invention will become apparent when the following detailed description is read in conjunction with the attached drawings, in which:

FIGS. 5-7 are schematic diagrams illustrating the operation of the head load/unload mechanism;

FIG. 8 is a fragmentary view showing a load pad as used in a single sided drive in place of the movable read/write head of the double sided drive shown in FIG. 1; and FIG. 9 is a graph illustrating the lifter arm position versus time, as a function of the bias applied to the lifter arm, for a typical head loading cycle.

IV. DETAILED DESCRIPTION OF THE ILLUSTRATED EMBODIMENT

While the invention is described in detail hereinbelow with reference to a particular embodiment, it is to be understood that there is no intent to limit it to that embodiment. On the contrary, the intent is to cover all modifications, alternatives and equivalents which fall within the spirit and scope of the invention as defined by the appended claims.

Figure 1:
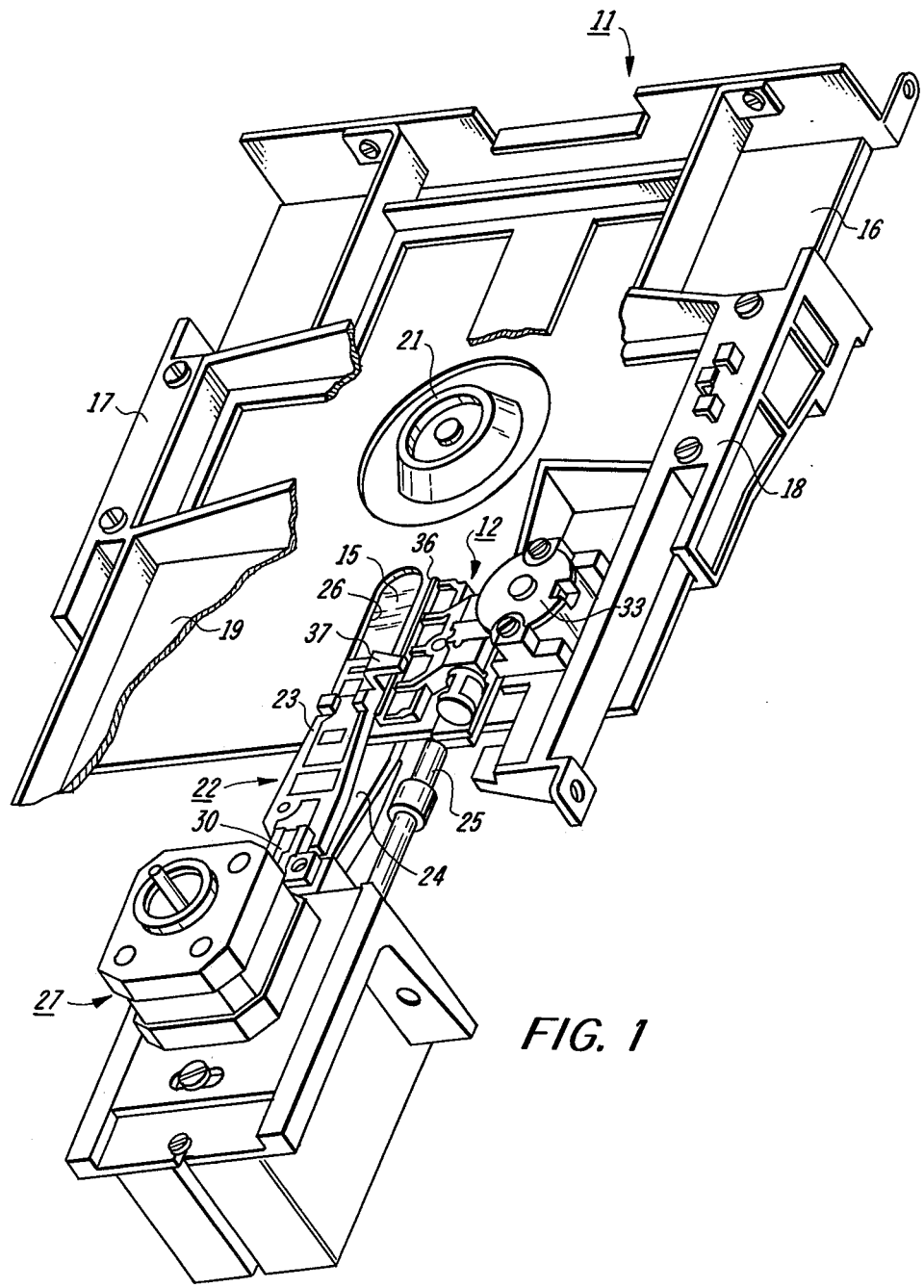
FIG. 1 is a cut-away perspective view of a double sided floppy disk drive having a head load/unload mechanism constructed in accordance with the present invention.

Turning now to the drawings, and at this point especially to FIG. 1, there is a double sided floppy disk drive 11 having a solonoid controlled head load/unload mechanism 12 for selectively loading and unloading a pair of read/write heads 13 and 14 (see FIGS. 5-7) into and out of data transferring relationship with the opposite sides of a magnetic recording medium 15. As previously mentioned, the recording medium 15 typically comprises a thin, pliant substrate which is coated with a magnetic oxide. Accordingly, the recording medium 15 is housed within a protective outer jacket 16 which is slidably supported by card guides 17 and 18 so that the jacket protected recording medium 15 may be easily and safely inserted into and removed from the drive 11. The card guides 17 and 18 are secured to the base frame 19 of the drive 11.

In operation, the recording medium 15 is clamped on a spindle 21 (by means not shown) for rotation within its protective jacket 16. A carriage 22, which has an upper arm 23 for supporting the upper or side-1 read/write head 13 and a lower arm 24 for supporting the lower or side-0 head 14, is mounted on a guide rail 25 for movement radially relative to the recording medium 15. Radially extending access slots 26 (only one can be seen) are cut through the opposite faces of the protective jacket 16 and are aligned with the read/write heads 13 and 14. Furthermore, there is an actuator 27 (such as the band drive disclosed in U.S. Pat. No. 4,161,004, which issued July 10, 1979 for a "Head Positioning Mechanism for Recording/Playback Machine") which is coupled to the carriage 22 for precisely controlling the positioning of the heads 13 and 14 radially relative to the recording medium 15. Consequently, data may be selectively transferred to or from any one of a plurality of concentric data tracks on either side of the recording medium 15.

The upper arm 24 is supported on the carriage 22 by a flexure 30 so that the side-1 read/write head 13 can be moved toward and away from the recording medium 15 under the control of the head load/unload mechanism 11. In contrast, the position of the other or side-0 head 14 is fixed relative to the nominal plane of the recording medium 15 because the lower arm 24 is rigid with the carriage 22. A similar head/carriage assembly is shown in U.S. Pat. No. 4,151,573, which issued Apr. 24, 1979 on a "Magnetic Recording Device for Double Sided Media." Nevertheless, it should be noted that the fixed head 14 loads against the recording media 15 only when the movable head 13 is loaded there against to provide the necessary reactive force. As will be seen in FIGS. 5 and 6, the movable head 13 is urged toward its loaded position by a bias spring 28 which is typically selected so that there is a head/media load force of about 15-20 grams.

In accordance with the present invention, as shown in FIGS. 1-4, the head load/unload mechanism 12 comprises a bidirectionally damped lifter arm 31 which is rotatably mounted on a control arm 32 for selectively loading and unloading the read/write heads 13 and 14 under the control of a snap action solenoid 33. A screw 34 or the like fastens the lifter arm 31 to a shaft 35 which is journalled for viscously damped rotation on the control arm 32, as more fully described hereinbelow. At the outer end of the lifter arm 31 there is a transversely elongated bail 36 which underlies a tab 37 projecting from the support arm 23 for the movable head 13, regardless of where the head 13 happens to be positioned radially with respect to the recording medium 15.

Figure 3:
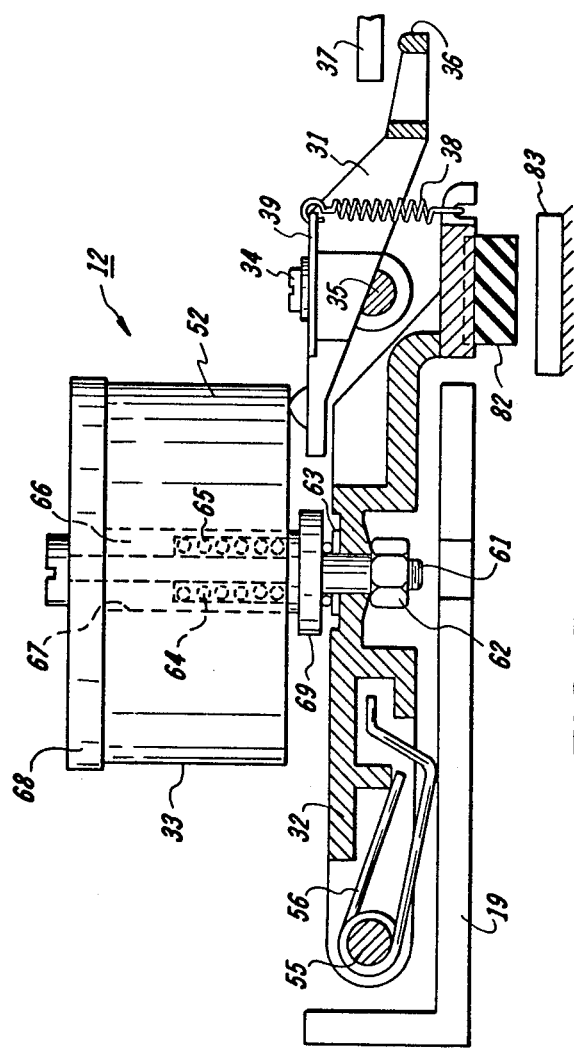
FIG. 3 is an elevational view of the head load/unload mechanism, which is partially in cross section.

A bias spring 38 is connected between the lifter arm 31 and the control arm 32 to apply a clockwise torque to the shaft 35 (as viewed in FIG. 3). Hence, the bail 36 tends to swing downwardly away from the tab 37, thereby allowing the movable head 13 to load against the recording medium 15 under the influence of the load spring 28 (FIGS. 5-6). Preferably, the bias spring 38 is connected to the lifter arm 31 by an anchor plate 39 which has an elongated slot 40 for receiving the screw 34. In that event, the screw 34 may be momentarily loosened to permit adjustment of the head load time, as indicated in FIG. 9, by sliding the anchor plate 39 forward or back on the lifter arm 31 to increase or decrease the length of the moment arm $l_d$ (FIG. 5) through which the torque is applied to the shaft 35 by the bias spring 38.

As shown, the control arm 32 is journalled at 53 and 54 for rotation on a shaft 55 which, in turn, is anchored on, say, the base frame 19. Furthermore, a torsion spring 56 is wound on the shaft 55 to act against the base frame 19 and the control arm 32, thereby supplying a bias which causes the control arm 32 to rotate in a counterclockwise direction on the shaft 55. Under quiescent conditions, the bias applied to the control arm 32 maintains the inner end of the lifter arm 31 in pressure contact with a reaction surface such as the bottom of the solenoid coil housing 52, so that the bias supplied by the bias spring 38 and the load spring 28 is equalized while the movable head 13 is displaced from the recording medium 15 in an unloaded position. Indeed, the head/media displacement under quiescent conditions is advantageously selected to allow ample clearance for insertion or removal of the jacket protected recording medium 15.

Referring specifically to FIG. 3, to allow the movable head 13 to move from its unloaded position to a loaded position, the control arm 32 is clamped on the push rod 61 of the solenoid 33 by a captured nut 62 and a washer 63. The washer 63 bears against the lower end of a relatively stiff compression spring 64. The upper end of the compression spring 64 bears against an internal shoulder 65 of a sleeve 66 which extends through a bore 67 in the solenoid coil housing 52 coaxially with the push rod 61 so that its upper end bears against the inner surface of the solenoid armature 68. The captured nut 62 is, in turn, threaded on the lower end of the push rod 61 so that the quiescent position of the lifter arm 31 may be adjusted by rotating the push rod 61 to thread the nut 62 upwardly or downwardly relative to a stop 69 on the lower end of the sleeve 66 beneath the coil housing 52. The surface of the control arm 32 which bears against the nut 62 advantageously has a radius which is selected to minimize binding of the control arm 32 and the nut 62.

As best shown in FIGS. 5–7, when the solenoid 33 is energized, the push rod 61 pushes down on the control arm 32, thereby causing it to rotate in a clockwise direction against the bias supplied by the torsion spring 56. That eliminates the reaction force acting on the inner end of the lifter arm 31, with the result that the shaft 35 rotates in a clockwise direction under the influence of the bias spring 38, the support arm 23, and the load spring 28. The movable head 13, therefore, moves from its unloaded position to its loaded position under the influence of the load spring 28, but the rate at which the head 13 moves is limited by the viscous damping of the shaft 35, i.e., the limiting factor is the rate at which the bail 36 swings downwardly away from the tab 37. The angle through which the lifter arm 31 rotates is dependent on the rotation required to re-engage the inner end of the lifter arm 31 with the solenoid coil housing 52. Desirably, the length of the solenoid stroke and the configuration of the lifter arm 31 are selected so that there is sufficient rotation to cause the bail 36 to swing clear of the tab 37 when the movable head 13 is loaded against the recording medium 15 (see FIG. 7).

When the solenoid 33 is de-energized, the torsion spring 56 rotates the control arm 32 counterclockwise on the shaft 55. That increases the reactive force that is applied to the inner end of the lifter arm 31 by the solenoid coil housing 52, thereby causing the lifter arm 31 to counter-rotate through the aforementioned angle at a rate which is again controlled by the viscous damping of the shaft 35. Accordingly, the bail 36 re-engages the tab 37 on the support arm 23 to restore the movable head 13 to its unloaded position.

Figure 2:
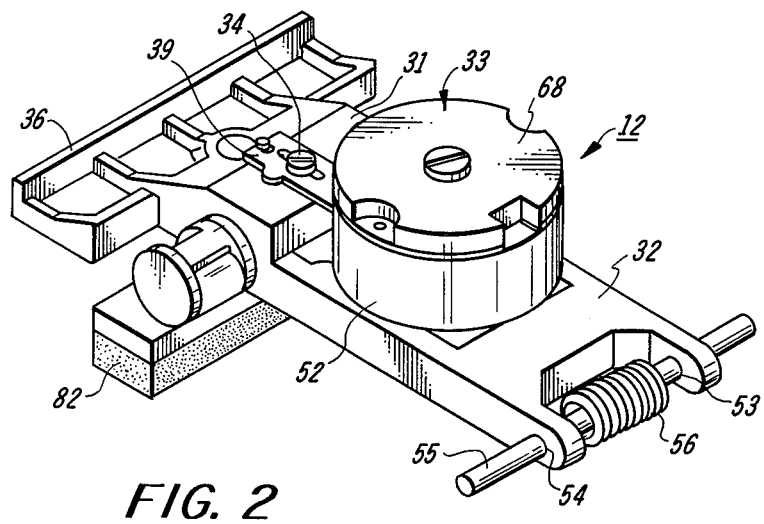
FIG. 2 is an enlarged perspective view of the head load/unload mechanism.
Figure 4:
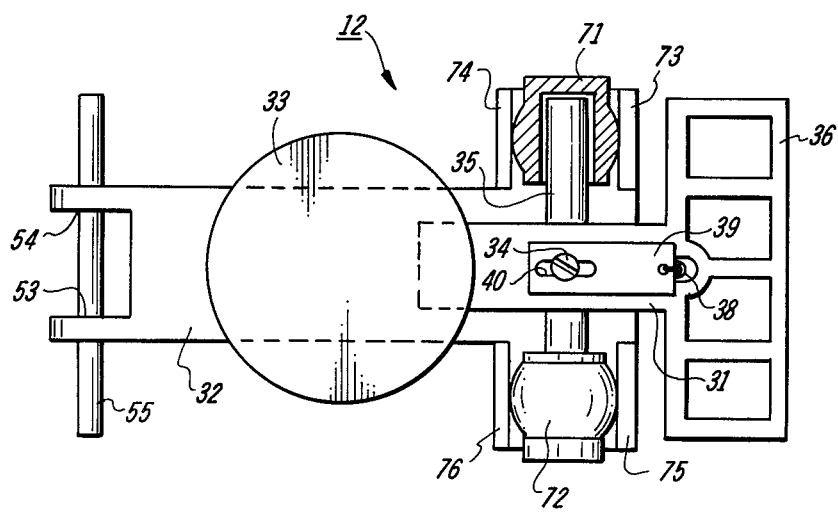
FIG. 4 is a plan view of the head load/unload mechanism.

Focusing for a moment on FIGS. 2 and 3, to simplify the assembly of the head load/unload mechanism 12, there are a couple of self-aligning bushings 71 and 72 which are selected to have an inside diameter that is approximately 0.005 inches greater than the diameter of the shaft 35. The bushing 71 and 72 are prefilled with a metered amount of thixotropic viscous grease, such as the Molykote 111 compound of the Dow Corning Company, and are press fit onto the opposite ends of the shaft 35 so that the viscous grease extrudes out to fill the clearances between the shaft 35 and the bushings 71 and 72. The bushings 71 and 72 are then seated between and adhesively bonded to yoke-like lug pairs 73, 74 and 75, 76 which are mounted in spaced apart relationship on the control arm 34. To complete the assembly, the lifter arm 31 is fastened to the shaft 35.

Referring to FIG. 8, it will be evident that the head load/unload mechanism 12 may be used in a single sided floppy disk drive to selectively move a load pad 81 into and out of the head loading contact with the recording medium 15 under the control of the snap action solenoid 33. That application need not be described in detail because it does not alter the principles of operation of the head load/unload mechanism 12 nor impose any special requirements on it.

Furthermore, as best shown in FIGS. 2 and 3, the head load/unload mechanism 12 may be employed in a single or double sided floppy disk drive for selectively moving a pressure pad 82 into and out of pressure transmitting relationship with a platen 83 under the control of the solenoid 33. The jacket protected recording medium 15 is disposed between the pressure pad 82 and the platen 83 so that the recording medium 15 is flattened when the solenoid 33 is energized to move the pressure pad 82 into pressure transmitting relationship with the platen 83. Floppy disk drives usually have a provision of this type because any bowing of the recording medium 15 is likely to degrade the data transferring efficiency of the read/write head or heads by reducing the head/media compliance.

V. CONCLUSION

In view of the foregoing, it will now be understood that the present invention provides a relatively reliable and economical bidirectionally damped head load/unload mechanism for rotating magnetic memories, such as single and double sided floppy disk drives. Furthermore, it will be evident that the head load/unload mechanism of this invention may be used not only for selectively loading and unloading the read/write head or heads of such a drive, but also for selectively moving a pressure pad into and out of pressure transmitting relationship with a platen in such a drive to flatten the recording medium and its protective jacket when the head or heads are loaded against the recording medium.

What is claimed is:

1. A head load/unload mechanism for a rotating magnetic memory having a read/write head which is mounted on a support arm for movement into and out of data transferring relationship with a magnetic recording medium, and load means coupled to said support arm for urging said head into data transferring relationship with said recording medium; said head load/unloaded mechanism comprising the combination of a pivotally supported and biased control arm, a solenoid having a push rod clamped to said control arm for rotating said control arm against said bias when said solenoid is energized, a lifter arm mounted for viscously damped rotation on said control arm, said lifter arm having an inner end which is urged into pressure contact with a reaction surface by the bias applied to said control arm and an outer end which is disposed between said support arm and said recording medium, and biasing means coupled to said lifter arm for causing the outer end of said lifter arm to swing away from and toward said support arm as said solenoid is energized and de-energized, whereby said head is moved into and out of data transferring relationship with said recording medium at damped rates in response to the energization and deenergization, respectively, of said solenoid.

2. The head load/unload mechanism of claim 1 wherein said solenoid is a snap action device having a coil housing, and said reaction surface is an outer surface of said housing.

3. The head load/unload mechanism of claim 1 wherein
said memory is a floppy disk drive having a spindle for rotating said recording medium at a substantially constant angular velocity,
said recording medium is housed for rotation in a protective outer jacket which is slidably supported in said drive, whereby said recording medium and its protective jacket may be removed from said drive, and
said jacket has at least one radially elongated access slot passing therethrough, whereby said head may be compliantly loaded directly against said recording medium.

4. The head load/unload mechanism of claim 3 wherein
said solenoid is a snap action device having a coil housing,
said reaction surface is an outer surface of said housing, and
said drive further includes
a platen disposed on one side of said recording medium; and
a pressure pad supported by said control arm on the other side of said recording medium for movement into and out of pressure transmitting relationship with said platen as said solenoid is energized and de-energized, whereby the recording medium and its protective jacket are flattened between said pressure pad and said platen which said head is loaded into data transferring relationship with said recording medium.

5. In a floppy disk drive having a guide for supporting a removable magnetic recording medium, a spindle for rotating said recording medium at a substantially constant angular velocity, a fixed read/write head disposed on one side of said recording medium, a flexure mounted support arm disposed on the opposite side of said recording medium, a tab projecting laterally from said support arm, a reaction element mounted on said support arm for movement toward and away from said recording medium, and load means coupled to said support arm for urging said reaction element toward said recording medium; the improvement comprising a head load/unload mechanism for selectively moving said reaction element toward and away from said recording medium to load and unload, respectively, the fixed head; said head load/unload mechanism comprising
a control arm pivotally supported on said drive,
a solenoid having a push rod clamped to said control arm for rotating said control arm in one direction when said solenoid is energized,
biasing means coupled to said control arm for urging said control arm to rotate in the opposite direction,
a lifter arm supported for bidirectionally damped rotation on said control arm, said lifter arm having an inner end which is urged into pressure contact with a reaction surface by the bias applied to said control arm and an outer end which is transversely elongated to form a bail, said bail being disposed between said recording medium and said tab, and
further biasing means coupled to said lifter arm for swinging said bail away from said tab when said solenoid is energized while allowing the reaction between the inner end of said lifter arm and said reaction surface to swing the outer end of said lifter arm back toward said tab when said solenoid is de-energized, whereby said reaction element is moved toward and away from said recording medium in response to the energization and de-energization, respectively of said solenoid.

6. The improvement of claim 5 wherein
said lifter arm is supported on said control arm by means comprising
bushing means secured to said control arm; and
a shaft secured to said lifter arm, said shaft being received for rotation within said bushing means and having a finite clearance from said bushing means; and
the rotation of said lifter arm is bidirectionally damped by a thixotropic viscous grease disposed in said clearance.

7. The improvement of claim 6 wherein said bushing means are a pair of self aligning bushings which are prefilled with said grease and fit onto the opposite ends of said shaft.

8. The improvement of claim 5 wherein
said solenoid is a snap action device having a coil housing; and
said rection surface is an outer surface of said coil housing.

9. The improvement of claim 8 wherein
said lifter arm is supported on said control arm by means comprising:
a shaft which is secured to said lifter arm; and
a pair of self aligning bushings which are secured to said control arm and fit with finite clearances over opposite ends of said shaft; and
said clearances are filled with a thixotropic viscous grease to bidirectionally damp the rotation of said control arm.

10. The improvement of claim 9 wherein said reaction element is another read/write head, whereby said drive operates as a double sided drive.

11. The improvement of claim 9 wherein said reaction element is a load pad, wherby said drive operates as a single sided drive.

* * * * *